A. L. JACKSON.
COTTON HARVESTING MACHINE.
APPLICATION FILED MAY 16, 1903.
1,014,880.
Patented Jan. 16, 1912.
2 SHEETS—SHEET 1.
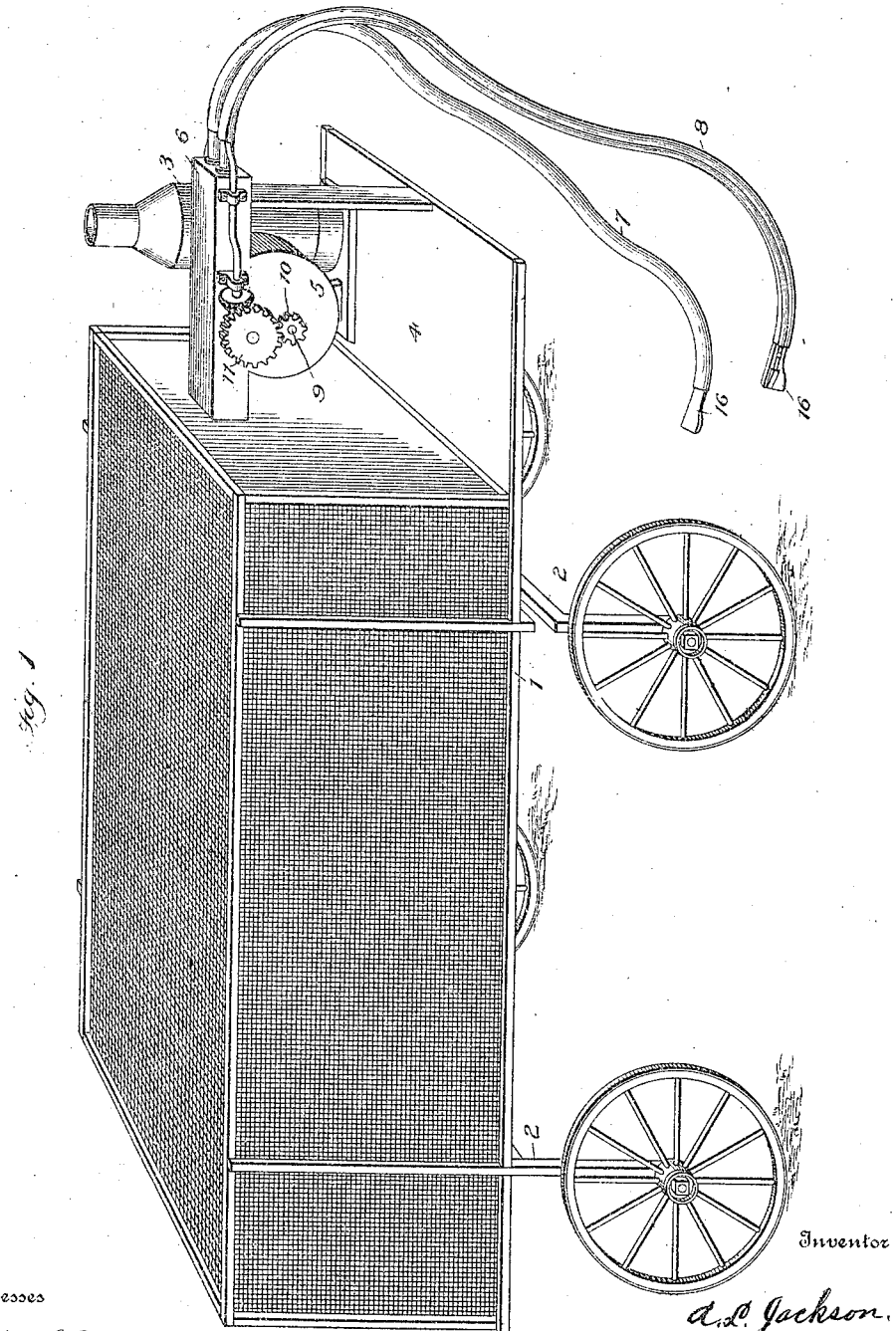

A. L. JACKSON.
COTTON HARVESTING MACHINE.
APPLICATION FILED MAY 16, 1903.
1,014,880.
Patented Jan. 16, 1912.
2 SHEETS—SHEET 2.
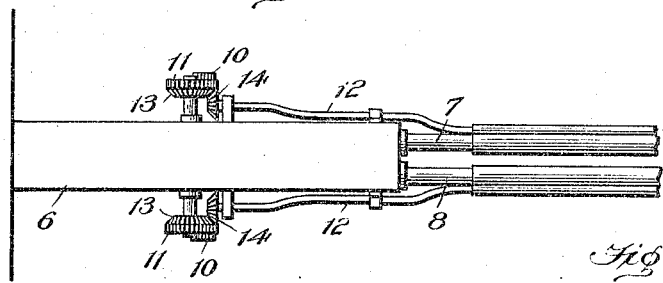
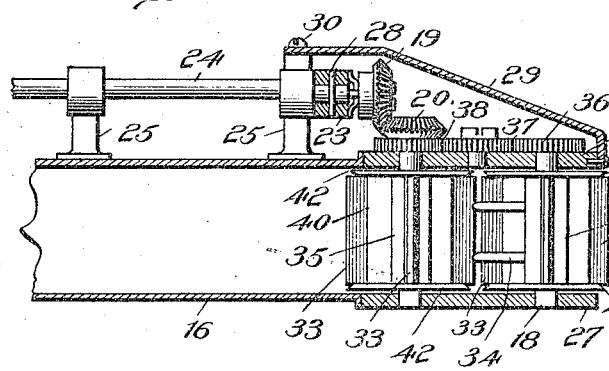
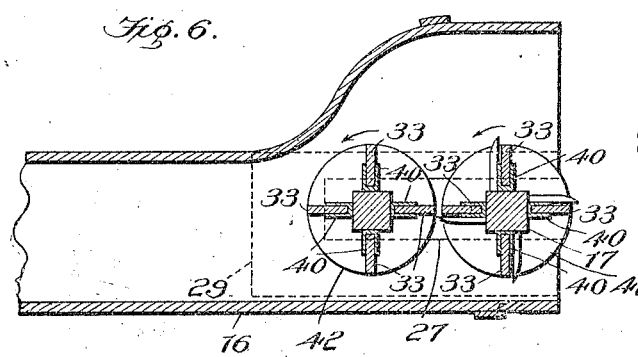
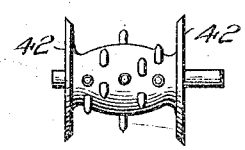
Witnesses
F. J. Singleton
Frank W. Marlow
Inventor.
A. L. Jackson

UNITED STATES PATENT OFFICE.

ANDREW L. JACKSON, OF FORT WORTH, TEXAS.

COTTON-HARVESTING MACHINE.

1,014,880. Specification of Letters Patent. Patented Jan. 16, 1912.

Application filed May 16, 1903. Serial No. 157,379.

*To all whom it may concern:*

Be it known that I, ANDREW L. JACKSON, a citizen of the United States, residing at Fort Worth, Texas, have invented a Cotton-Harvesting Machine, of which the following is a specification.

This invention relates to a machine for harvesting cotton and more particularly to a machine that will, when properly guided, pick the cotton from the bolls on the cotton plant by positive and certain motion, and the object is to construct a picker which will reduce the cost of gathering or harvesting cotton.

The advantages of the picker are that it will pick the cotton faster than can be done by hand, save time that is required for the hand to put cotton in a sack and the time that is required to empty the sack, relieve the operator of the burden of carrying the cotton in sacks that are hung on the body, and puts the cotton in better condition for ginning,—the greater part of the dust being taken out of the cotton and the tufted knots of cotton being torn to pieces.

Other objects and advantages will be fully understood from the following description and claims.

Reference is had to the accompanying drawings which form a part of this specification and application.

Figure 1 is a perspective view of a machine provided with two pickers. Fig. 2 is a broken plan view, illustrating part of the driving mechanism. Fig. 3 is a cross-section of one of the picker tubes and the picker driving shaft. Fig. 4 is a broken sectional view, being a plan view of the picker and the driving gear for the picker. Fig. 5 is a cross-section of a picker drum and its wings or fans, illustrating a variation in the shape of the drum. Fig. 6 is a vertical section of the picker tube, showing an end view of the rotary picker. Fig. 7 is a detail view of the yielding clutch,—two views being shown, one a rear end view of the bevel gear 19 with the spindle in section, and the other a broken section. Fig. 8 illustrates a picker drum without the yielding wings.

Similar characters of reference are used to indicate the same parts throughout the several views.

The picker is mounted on a wagon or truck which is provided with a body or receiver 1 which is mounted on the truck and may have the sides and top constructed of wire screen so that dust will escape from the cotton as it falls in the receiver. The truck is provided with arched axles 2 which will elevate the receiver as much as may be practical above the tops of the cotton plants. Another object in elevating the picker receiver is that the picker tubes may be located high enough to hang down so that they will not be heavy for the operators to carry. The wagon or truck may be driven by any suitable power, but it may be more practical to drive the truck by the same engine 3 that drives the picker mechanism.

The picking is done by means of rotary pickers in combination with suction. The suction is produced by means of a rotary fan, such as are in common use. One fan will produce suction enough for several pickers. The drawing shows two pickers, but any number of pickers or several pickers can be connected to the tube in which suction is created by the fan. The fan may be driven by any suitable motive power. The motive power which drives the fan will serve to drive the pickers.

Fig. 1 shows, in conventional form, an engine 3 mounted on the front platform 4 of the truck. The fan is mounted in the casing 5 which is connected with the tube 6. The illustration shows two picker tubes 7 and 8 connected to the tube 6. The engine drives the fan shaft 9 which drives the cog wheel 10 which drives the cog wheel 11. In practice the cog wheel 10 must be considerably smaller than the cog wheel 11 because the fan will have to run several times as fast as the rotary pickers. A similar pinion 11 is mounted on the other side of the tube 6 and may be driven by a cog wheel which corresponds to wheel 10, as shown in Fig. 2. The pickers are located in the mouths of the picker tubes and are driven by means of small flexible shafts 12. Power is applied to the shafts 12 by means of the beveled cogs 13 and beveled pinions 14, the beveled cogs 13 being mounted on shafts of pinions 11. Each picker tube and its corresponding shaft may be inclosed in a casing 16, shown in cross-section in Fig. 3. The picker tubes are small flexible tubes provided with small metallic casings 16 mounted in the free ends of the tubes. A rotary picker 17 is mounted on journals 18 in the end of each casing 16.

The picker 17 is driven by the beveled cog 19 which is mounted on the spindle 24 and by the beveled pinion 20, the intermediate gear wheel 37, and the gear wheel 36 which is mounted on the journal 18. The shaft 12 is the flexible shaft in common use and consists of the outer casing 21 and the inner coil of wire 22. The wire is connected to the spindle 24. The casing 16 has lugs 25 which may be formed integral with the casing or they may be riveted on the casing. These lugs constitute bearings for the spindle 24 of the shaft 12. A collar 23 holds the spindle 24 in place, being made rigid therewith by pin 28. Bearing bars 27 are mounted in the walls of the casing 16 because the walls of casing 16 would not be strong enough for journal bearings. A small casing 29 is provided for the gearing and is held in place by screws 30.

The mouth of casing 16 is flared down slightly to provide space for the rotation of the picker teeth, and to allow space for the cotton to pass. The picker drum 17 may be of any suitable shape in cross-section. The teeth 34 may be curved backward slightly near the outer ends. The mechanism already described will answer for picking all ordinary cotton. But a brush will be sometimes necessary to remove the cotton from the picker teeth. For this purpose a rotary brush 35 is journaled in the casing 16 adjacent to the picker 17. The brush consists of a drum or shaft 35 of any suitable shape in cross-section and the wings or fans 33, preferably of some flexible material, such as rubber or leather, to which the cotton fibers will not adhere, and the seats 40 for the wings or fans 33. The seats 40 may be attached to the drums 35 in any suitable manner. This brush is operated or rotated by the bevel gearing 19 and 20. In order to rotate the picker in the proper direction intermediate gearing will be necessary. A cog 37 has a bearing in bearing bar 27 and drives the cog 38 mounted on the journal of the brush 35. Cog 37 drives also cog 36 mounted on the picker journal.

The rotary picker consists of a drum 17, of any suitable shape journaled in bearing bars 27, and provided with teeth 34 secured therein. The teeth are beveled near their points, as shown in the drawings. In order to prevent cotton from clinging or hanging on the teeth it is advantageous to attach wings or fans 33 to the drum 17 adjacent to the teeth. The wings or fans are sometimes necessary because the centrifugal force is not always sufficient to throw the cotton from the teeth, the points of the teeth not being far enough radially from the center of the picker drum to gather much centrifugal force during the rotation of the picker drum. The teeth should be polished smooth. The wings are attached to the drums by means of seats 40 which may be of thin metal brazed or soldered or otherwise attached to the drums. The wings or fans 33 are removable so that new wings can be inserted. The drums 17 are provided with circular or radiating flanges 42, one at each end, to prevent fibers of cotton from winding on the journals of the drums. Without such flanges cotton would sometimes lock the picker drums against rotation. The brush drum 35 is also provided with the flanges 42 for the same purpose. The cotton is loosened from the bolls by the picker teeth and is forced through the flexible pipes or tubes by the suction of the fan.

In order to prevent the breaking of the flexible shafts should the pickers become choked for any reason, a yielding clutch is provided. The bevel gear 19 is mounted on the spindle 24, not rigidly, but will normally rotate with the spindle. A spring plate 32 is attached to the hub of the gear 19 and is provided with a projection so placed that it normally rests in a cavity in the collar 23 which is rigid with the spindle. The tension of the spring plate 32 is such that it normally holds the projection in the cavity in the collar so that the gear 19 is forced to turn with the spindle 24. But should the picker mechanism become choked so that the picker could not rotate, the spring plate will yield and allow the spindle 24 to rotate without driving the gear 19. The picker drum may be of different shapes. Fig. 5 shows a drum 41 which is cylindrical.

There may be many variations in the assembling of the various parts of the mechanism and there may be variations in the construction of the various parts. The picker teeth may be straight and pointed instead of being curved at their ends. If the suction in the tubes is sufficient, the teeth will, aided by the suction, deliver the cotton in the mouth of the tube. The tubes must have unobstructed passages therethrough. For this reason the shafts are placed on the outside of the picker tubes. It is preferable to put each picker tube with its corresponding shaft in a casing such as is shown and described to prevent the tube and the shaft from being disarranged and tangled in the cotton plants, and to facilitate the handling of the tube and shaft. With picker tubes having smooth interior walls there will be no difficulty in forcing the cotton through the tubes by means of suction. The number of picker tubes and pickers may be increased as needed. Each operator may use two pickers. Enough pickers may be added for picking four or five or more rows of cotton on one trip across the field. The picker tubes and the shafts for the pickers may be made as long as may be practical.

The picker tubes must be light enough to be manually operated. The tubes must be flexible and yet strong enough to prevent collapsing. The pickers must be so light that a person can carry one in each hand and reach the bolls of cotton almost as easily as a person can reach the bolls of cotton with the hands without a picker. In one respect the picker will make the boll more easily reached than by hand because a person can reach farther with a picker than he can with his hand.

Having fully described my invention, what I claim as new and desire to secure by Letters Patent, is,—

1. A cotton harvesting machine comprising a suction tube or pipe, a rotary picker mounted in the mouth of said tube and being provided with teeth projecting out of said tube, and means for operating said picker.

2. A cotton harvesting machine comprising a tube provided with means for forcing the cotton therethrough, a rotary picker mounted in the mouth of said tube and provided with teeth projecting out of said tube, and means for operating said picker.

3. A cotton harvesting machine comprising a tube provided with means for forcing the cotton therethrough, a rotary picker mounted in the mouth of said tube and having teeth that will reach out of the mouth of the tube as the picker is rotated, and means for operating the picker.

4. A cotton harvesting machine comprising a tube having an unobstructed passage therethrough and provided with means for creating suction therein, a rotary picker mounted in the mouth of said tube and provided with teeth projecting out of the mouth of said tube, and means outside of said tube for driving said picker.

5. A cotton harvesting machine comprising a receiver having a part of the walls thereof constructed of wire screen, flexible pipes or tubes having communication with said receiver and provided with means for creating suction in said tubes, a rotary picker mounted in and provided with teeth projecting out of the mouth of each pipe or tube, and means outside of each tube or pipe for driving the picker mounted therein.

6. A cotton harvesting machine comprising a receiver, a plurality of flexible pipes or tubes having communication with said receiver, a fan for creating suction in said pipes or tubes, a motor for driving said fan, a rotary picker mounted in and provided with teeth projecting out of the mouth of each pipe or tube, a flexible shaft for driving each picker, and suitable gearing for driving said pickers by means of said motor.

7. A cotton harvesting machine comprising a receiver, a plurality of pipes or tubes having communication with said receiver and provided with means for creating suction therein, a rotary picker mounted in and provided with teeth projecting out of the mouth of each pipe or tube, a flexible shaft extending along each pipe or tube provided with suitable gearing for driving said pickers, and a motor driving said shafts.

8. A cotton harvesting machine having a plurality of flexible picker tubes or pipes provided with means for creating suction therein, a metallic casing mounted in the mouth of each tube or pipe, a rotary picker mounted in the mouth of each casing and having teeth projecting outside of said casing, a flexible shaft mounted on the outside of and carried by each pipe or tube, and beveled gearing mounted on each casing for driving said pickers.

9. A cotton harvesting machine comprising a receiver, a plurality of picker tubes or pipes connected to said receiver and provided with means for creating suction therein, a metallic casing mounted in the mouth of each tube or pipe, a rotary picker mounted in the mouth of each casing and having teeth projecting out of said casing, a flexible shaft mounted in the outside of and carried by each tube or pipe, beveled gearing mounted on each casing for driving said pickers, and a casing for each set of beveled gearing.

10. A cotton harvesting machine having a plurality of suction tubes or pipes, a rotary picker mounted in and provided with teeth projecting out of the mouth of each tube or pipe, means mounted on the outside of and carried by each tube or pipe for driving said pickers, and a brush mounted in each tube or pipe for taking cotton from the pickers.

11. A cotton harvesting machine having a plurality of suction tubes or pipes, a rotary picker mounted in the mouth of each tube or pipe, gearing mounted on the outside of and carried by each tube or pipe for driving said pickers, a yielding release for said gearing, a rotary brush mounted in each tube or pipe for taking cotton from the pickers.

12. A cotton harvesting machine comprising a plurality of flexible pipes, a rotary picker mounted in and provided with teeth projecting out of the mouth of each pipe, wings attached to each picker adjacent to the teeth thereof, and means for operating said pickers.

13. A cotton harvesting machine comprising a plurality of pipes, a rotary picker mounted in and provided with teeth projecting out of the mouth of each pipe, flexible wings attached to each picker adjacent to the teeth thereof, a rotary brush provided with flexible wings mounted adjacent to each picker, and means for operating said pickers and brushes.

14. A cotton harvesting machine comprising a plurality of pipes, a rotary picker mounted in the mouth of each pipe and provided with teeth for loosening the cotton from bolls, flexible wings attached to each picker adjacent to the teeth thereof to prevent cotton from clinging to said teeth, and means for operating said pickers.

15. A cotton harvesting machine comprising a plurality of pipes or tubes, a rotary picker mounted in the mouth of each pipe or tube, gearing for driving each picker mounted on the outside of each pipe or tube, a flexible shaft, and a yieldable clutch connecting each shaft with each set of gearing.

16. A cotton harvesting machine comprising a suction pipe, a rotary picker journaled in the mouth of said pipe and provided with teeth projecting out of the mouth of said pipe, a flange on each end of said picker to prevent cotton from winding on the journals of said picker, and means for operating said picker.

17. In a device of the character indicated, picking members and a yielding shelf moving therewith.

18. In a device of the character indicated, picking members and yielding shelves moving therewith and resting against the said picking members.

19. In a device of the character indicated, picking members and resilient rubber shelves moving therewith and supported against the said picking members.

20. In a rotary drum of the character indicated, teeth and yielding wings moving therewith.

21. In a device of the character indicated, drums having teeth projecting radially therefrom and wings mounted thereon and coöperating with said teeth, and a suction tube coöperating with said teeth and wings.

22. In a cotton harvesting machine, a suction tube, a rotary picker mounted in the mouth of said tube and provided with flanges on each end thereof parallel to the planes of and in close proximity to the side walls of said tube.

In testimony whereof I set my hand this 16th day of May, 1903, in the presence of two witnesses.

ANDREW L. JACKSON.

Witnesses:
K. W. O'REAR,
C. E. MARSHALL.